H. A. RISHEL.
AUTOMOBILE RADIATOR SHIELD.
APPLICATION FILED DEC. 4, 1916.
1,261,855. Patented Apr. 9, 1918.
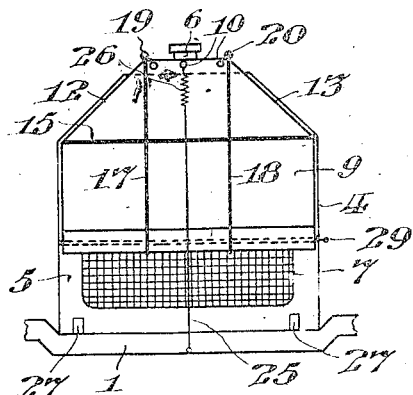
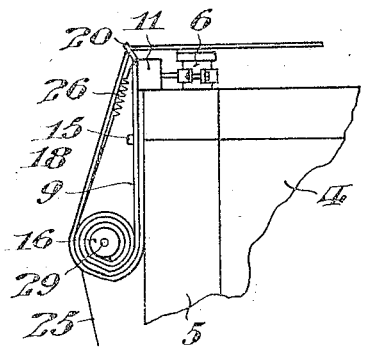
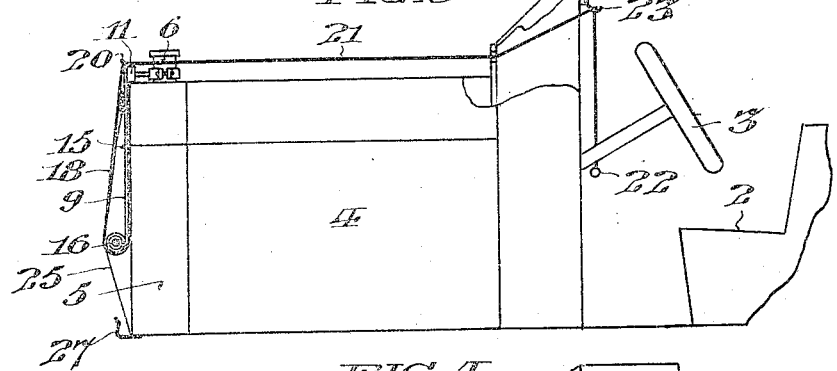
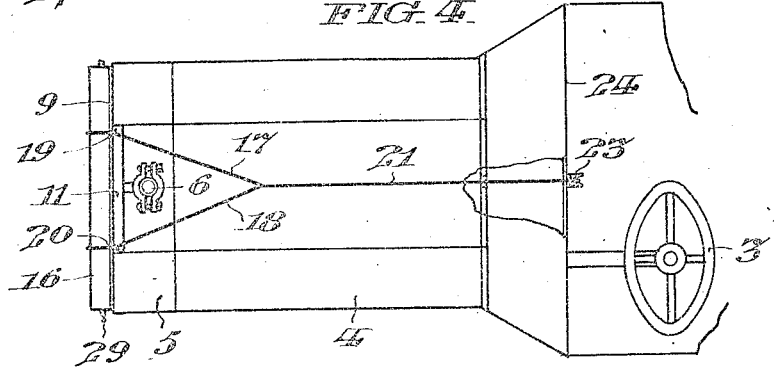
WITNESSES: L. T. Gilbert, Wm. J. Ellwanger
INVENTOR Harry A. Rishel
BY M. Henry Elfreth, ATTORNEY

UNITED STATES PATENT OFFICE.

HARRY A. RISHEL, OF PHILADELPHIA, PENNSYLVANIA.

AUTOMOBILE-RADIATOR SHIELD.

1,261,855.

Specification of Letters Patent.    Patented Apr. 9, 1918.

Application filed December 4, 1916.   Serial No. 134,963.

*To all whom it may concern:*

Be it known that I, HARRY A. RISHEL, a citizen of the United States, residing at Philadelphia, in the county of Philadelphia and State of Pennsylvania, have invented certain new and useful Improvements in Automobile-Radiator Shields, of which the following is a specification.

My invention relates particularly to vehicles which are arranged to be driven by motors whose temperature is reduced by suitably disposed radiators adapted to be cooled by exposure to the air currents induced by the motion of said vehicles.

The principal objects of my invention are to provide means adjustable to shield the radiator from such air currents, to expose it to said air currents, or to vary its effective area with respect thereto.

Other objects of my invention are to provide such a shield with means whereby it may be actuated from the seat of the operator, and to provide means for maintaining it in operative engagement with said radiator.

My invention further comprises means for yieldingly holding the shield when unfurled to cover or close the radiator, and includes a shield adapted to conform to a radiator of irregular contour.

Specifically stated my invention comprehends a shield or curtain which is secured to the top of the radiator, and provided with a roller arranged to be adjusted from the bottom thereof.

My invention also includes all of the various novel features of construction and arrangement as hereinafter more definitely specified.

In the accompanying drawing Figure 1 is a front elevational view of an automobile radiator, showing a convenient embodiment of my invention applied thereto; Fig. 2 is an enlarged fragmentary side elevational view of the structure show in Fig. 1; Fig. 3 is a fragmentary side elevational view of an automobile showing the means for controlling the shield from the seat of the operator; and Fig. 4 is a plan view of the structure shown in Fig. 3.

In said figures the automobile comprises the frame 1, seat 2, steering wheel 3, engine casing 4 and radiator 5 having the filling neck 6, all of well known construction.

The radiator 5 has in its forward wall a reticulated opening 7, which may conveniently be controlled by the shield or curtain 9, shaped to substantially conform to the contour of said radiator and secured at its upper end by rivets 10 to the bracket 11 which may be preferably attached to and supported by the filler neck 6, as shown in Figs. 2, 3 and 4.

The curtain 9, as best shown in Fig. 1, has its upper corners cut away so that the outer portions 12 and 13 of its upper edge incline downwardly to meet its lateral edge, at whose junction the curtain is conveniently provided with the transversely disposed stiffening bar 15, best shown in Figs. 1 and 2, and arranged to hold the corners distended.

The curtain 9 is provided at its lower end with a roller 16 upon which it may be furled by the cords or chains 17 and 18 which may be secured to the bracket 11 behind said curtain and extend downwardly and around the roller 16 and upwardly through suitable guides 19 and 20, and rearwardly over the engine casing 4, in convergent relation to join with the single cord or chain 21 having the terminal knob or button 22, disposed convenient to the operator's position, said cord or chain being arranged to be attached to the catch or hook 23 on the dash 24, to hold the curtain 9 in any desired adjusted position with respect to the opening 7 in the radiator, as best shown in Figs. 1 and 3.

The curtain 9 may be maintained in operative engagement with the radiator 5 in opposition to air currents tending to displace said curtain, it may be provided with a strap or cord 25 having the spring 26 and overlying said curtain and having its opposite ends attached to the top and bottom respectively of said radiator, so that the curtain may be rolled or furled and unfurled between said strap or cord 25 and the reticulated face of said radiator.

The curtain 9 when unfurled to entirely close the radiator 5 may be engaged at its bottom end by spring fingers 27 which are arranged to engage the roller 16 to prevent said curtain from being displaced by air currents when the engine is stopped and the machine parked.

The curtain roller 16 may be provided with the indicating pointer 29 projecting axially therefrom and visible to the operator to indicate the position of said roller and the consequent area of the reticulated opening exposed to air currents.

It may be here noted that while the angine is operating, the pressure of the atmosphere, due to the partial vacuum created by said engine fan will tend to maintain the curtain in operative contact with the radiator face, and furthermore the motion of the vehicle will tend to create wind pressure upon said curtain tending to force it into operative contact with said radiator face.

If the curtain 9, is down and covers the radiator when the car is running the parts will overheat. It is therefore important to be able to positively move the curtain to uncover the radiator when the car is running, but this presents difficulties, for the wind pressure tends to hold the curtain in place over the radiator. By my invention means are provided for positively peeling the curtain off the radiator by rolling its lower edge, against the adhesion effect of wind pressure when the car is running, so that when the operator pulls or manipulates the rigging 21, from the seat and while the car is running he knows that the radiator is uncovered and is sure that the engine will not overheat. Of course when the curtain is unrolling downward and covering the radiator the wind pressure due to movement of the car is negligible.

It is quite possible however that sudden blasts of air directed laterally upon said curtain might tend to dislodge it from its operative position and it is for this purpose that the strap or cord 25 is employed.

I do not desire to limit my invention to the precise details of construction and arrangement herein set forth as it is obvious that various modifications may be made therein without departing from the essential features of the invention as defined in the appended claims.

Having thus described my invention, I claim:

A shield for an automobile radiator, having a roller arranged to roll from the bottom upward, and yielding means overlying said shield and arranged to maintain it in operative contact with the face of said radiator.

2. A shield for an automobile radiator, suspended from its upper end and having a roller at its lower end arranged to roll up and down, and spring fingers yieldingly engaging the roller when said shield is unfurled to cover said radiator.

3. A shield for an automobile radiator, comprising a curtain suspended from its upper end and having its upper corners cut away, a transversely disposed stiffening bar extending across said curtain adjacent to said cut away corners, a roller at its lower end adjustable vertically, rigging extending around said curtain and passing to the operator's position, for adjusting said roller, a band having a spring arranged to maintain said shield in operative contact with said radiator, and supports for said roller when said curtain is unfurled.

4. A shield for automobile radiators comprising a curtain adapted for immovable support at its top edge to the top of the radiator and for rolling on itself at its lower edge free of the radiator, in combination with rigging operable from the automobile for positively rolling the lower free edge of the curtain, whereby the curtain can be peeled off the surface of the radiator against wind pressure while the automobile is in motion.

In testimony whereof I have hereunto set my hand in the presence of two subscribing witnesses.

HARRY A. RISHEL.

Witnesses:
L. T. GILBERT,
WM. F. ELLWANGER.